United States Patent
Dutta et al.

(10) Patent No.: US 12,464,509 B2
(45) Date of Patent: Nov. 4, 2025

(54) SIDELINK RESOURCE RESERVATION USING NON-PREFERRED RESOURCE SIGNALING

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 18/046,211

(22) Filed: Oct. 13, 2022

(65) Prior Publication Data

US 2024/0129910 A1   Apr. 18, 2024

(51) Int. Cl.
*H04W 72/04* (2023.01)
*H04W 28/26* (2009.01)
*H04W 72/044* (2023.01)
*H04W 72/56* (2023.01)

(52) U.S. Cl.
CPC ......... *H04W 72/046* (2013.01); *H04W 72/56* (2023.01)

(58) Field of Classification Search
CPC ... H04W 72/04; H04W 72/569; H04W 92/18; H04W 72/23; H04W 76/14; H04W 72/56; H04W 72/046; H04B 7/0617; H04B 7/088; H04B 7/0695
See application file for complete search history.

(56) References Cited

U.S. PATENT DOCUMENTS

| | | |
|---|---|---|
| 2015/0222345 A1 | 8/2015 | Chapman et al. |
| 2017/0353984 A1 | 12/2017 | Abdallah et al. |
| 2018/0146466 A1 | 5/2018 | Shen et al. |
| 2019/0372647 A1 | 12/2019 | Su et al. |
| 2022/0167345 A1 | 5/2022 | Jeong et al. |
| 2022/0346118 A1* | 10/2022 | Wu .......... H04L 1/189 |
| 2023/0276462 A1* | 8/2023 | Hwang ........... H04L 5/0055 370/329 |
| 2023/0299838 A1* | 9/2023 | Kim ............ H04B 7/06952 370/329 |

(Continued)

FOREIGN PATENT DOCUMENTS

| | | |
|---|---|---|
| WO | 2022054942 A1 | 3/2022 |
| WO | 2022084974 A1 | 4/2022 |
| WO | 2022211495 A1 | 10/2022 |

OTHER PUBLICATIONS

International Search Report and Written Opinion—PCT/US2023/074670—ISA/EPO—Jan. 15, 2024.

*Primary Examiner* — Sai Aung
(74) *Attorney, Agent, or Firm* — Harrity & Harrity, LLP

(57) ABSTRACT

Various aspects of the present disclosure generally relate to wireless communication. In some aspects, a transmitter user equipment (UE) may identify beamforming information for transmitting a pre-reservation signal that indicates a set of non-preferred resources associated with a data transmission. The UE may transmit, to a receiver UE in accordance with the beamforming information, the pre-reservation signal that indicates the set of non-preferred resources associated with the data transmission. Numerous other aspects are described.

28 Claims, 11 Drawing Sheets

300 →

(56) References Cited

U.S. PATENT DOCUMENTS

| | | | |
|---|---|---|---|
| 2023/0308909 A1* | 9/2023 | Kim | H04W 76/14 |
| 2023/0345394 A1* | 10/2023 | Leon Calvo | H04W 56/0015 |
| 2023/0354385 A1* | 11/2023 | Oh | H04W 72/542 |
| 2024/0260054 A1* | 8/2024 | Kim | H04W 4/40 |
| 2024/0292352 A1* | 8/2024 | Kim | H04W 4/021 |
| 2025/0008532 A1* | 1/2025 | Dai | H04L 5/0094 |

* cited by examiner

SIDELINK RESOURCE RESERVATION USING NON-PREFERRED RESOURCE SIGNALING

FIELD OF THE DISCLOSURE

Aspects of the present disclosure generally relate to wireless communication and to techniques and apparatuses for sidelink resource reservation using non-preferred resource signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a transmitter user equipment (UE). The method may include identifying beamforming information for transmitting a pre-reservation signal that indicates a set of non-preferred resources associated with a data transmission. The method may include transmitting, to a receiver UE in accordance with the beamforming information, the pre-reservation signal that indicates the set of non-preferred resources associated with the data transmission.

Some aspects described herein relate to a method of wireless communication performed by a receiver UE. The method may include receiving, from a transmitter UE, a pre-reservation signal that indicates a set of non-preferred resources associated with a data transmission. The method may include transmitting an indication of the pre-reservation signal to another receiver UE, or transmitting a conflict indication to the transmitter UE, based at least in part on beamforming information associated with the pre-reservation signal.

Some aspects described herein relate to an apparatus for wireless communication performed by a UE. The apparatus may include a memory and one or more processors, coupled to the memory. The one or more processors may be configured to receive, from a transmitter UE, a pre-reservation signal that indicates a set of non-preferred resources associated with a data transmission. The one or more processors may be configured to transmit, to a receiver UE in accordance with the beamforming information, the pre-reservation signal that indicates the set of non-preferred resources associated with the data transmission.

Some aspects described herein relate to an apparatus for wireless communication performed by a UE. The apparatus may include a memory and one or more processors, coupled to the memory. The one or more processors may be configured to receive, from a transmitter UE, a pre-reservation signal that indicates a set of non-preferred resources associated with a data transmission. The one or more processors may be configured to transmit an indication of the pre-reservation signal to another receiver UE, or transmit a conflict indication to the transmitter UE, based at least in part on beamforming information associated with the pre-reservation signal.

Some aspects described herein relate to a non-transitory computer-readable medium that stores a set of instructions for wireless communication by a transmitter UE. The set of instructions, when executed by one or more processors of the UE, may cause the UE to identify beamforming information for transmitting a pre-reservation signal that indicates a set of non-preferred resources associated with a data transmission. The set of instructions, when executed by one or more processors of the UE, may cause the UE to transmit, to a receiver UE in accordance with the beamforming information, the pre-reservation signal that indicates the set of non-preferred resources associated with the data transmission.

Some aspects described herein relate to a non-transitory computer-readable medium that stores a set of instructions for wireless communication by a receiver UE. The set of instructions, when executed by one or more processors of the UE, may cause the UE to receive, from a transmitter UE, a pre-reservation signal that indicates a set of non-preferred resources associated with a data transmission. The set of instructions, when executed by one or more processors of the UE, may cause the UE to transmit an indication of the pre-reservation signal to another receiver UE, or transmit a conflict indication to the transmitter UE, based at least in part on beamforming information associated with the pre-reservation signal.

Some aspects described herein relate to an apparatus for wireless communication. The apparatus may include means for identifying beamforming information for transmitting a pre-reservation signal that indicates a set of non-preferred resources associated with a data transmission. The apparatus may include means for transmitting, to a receiver UE in accordance with the beamforming information, the pre-reservation signal that indicates the set of non-preferred resources associated with the data transmission.

Some aspects described herein relate to an apparatus for wireless communication. The apparatus may include means for receiving, from a transmitter UE, a pre-reservation signal that indicates a set of non-preferred resources associated with a data transmission. The apparatus may include means for transmitting an indication of the pre-reservation signal to another receiver UE, or means for transmitting a conflict indication to the transmitter UE, based at least in part on beamforming information associated with the pre-reservation signal.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
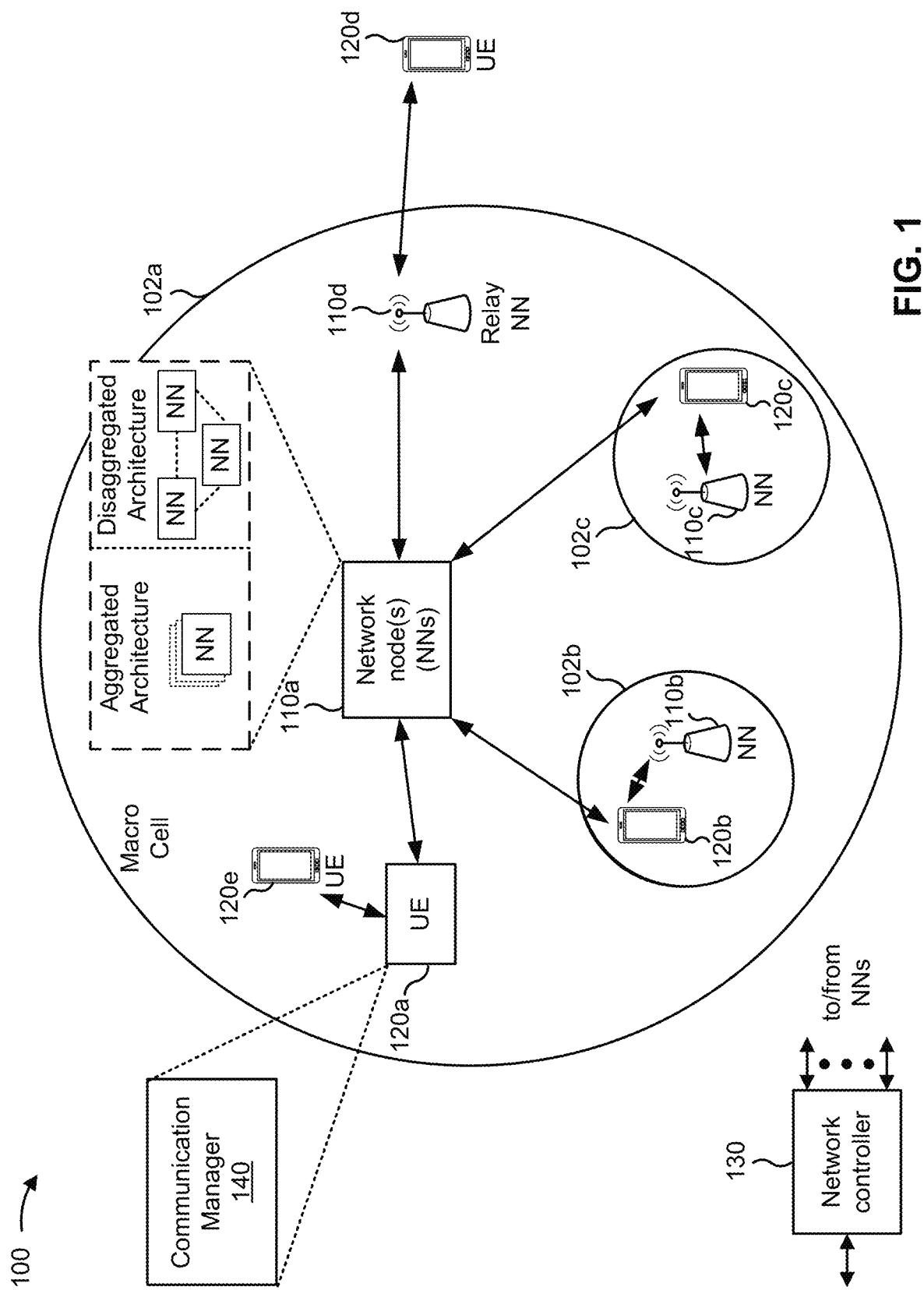
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify beamforming information for transmitting a pre-reservation signal that indicates a set of non-preferred resources associated with a data transmission; and transmit, to a receiver UE in accordance with the beamforming information, the pre-reservation signal that indicates the set of non-preferred resources associated with the data transmission. Additionally, or alternatively, the communication manager 140 may perform one or more other operations described herein.

In some aspects, the communication manager 140 may receive, from a transmitter UE, a pre-reservation signal that indicates a set of non-preferred resources associated with a data transmission; and transmit an indication of the pre-reservation signal to another receiver UE, or transmit a conflict indication to the transmitter UE, based at least in part on beamforming information associated with the pre-reservation signal. Additionally, or alternatively, the communication manager 140 may perform one or more other operations described herein.

As indicated above, FIG. 1 is provided as an example. Other examples may differ from what is described with regard to FIG. 1.

Figure 2:
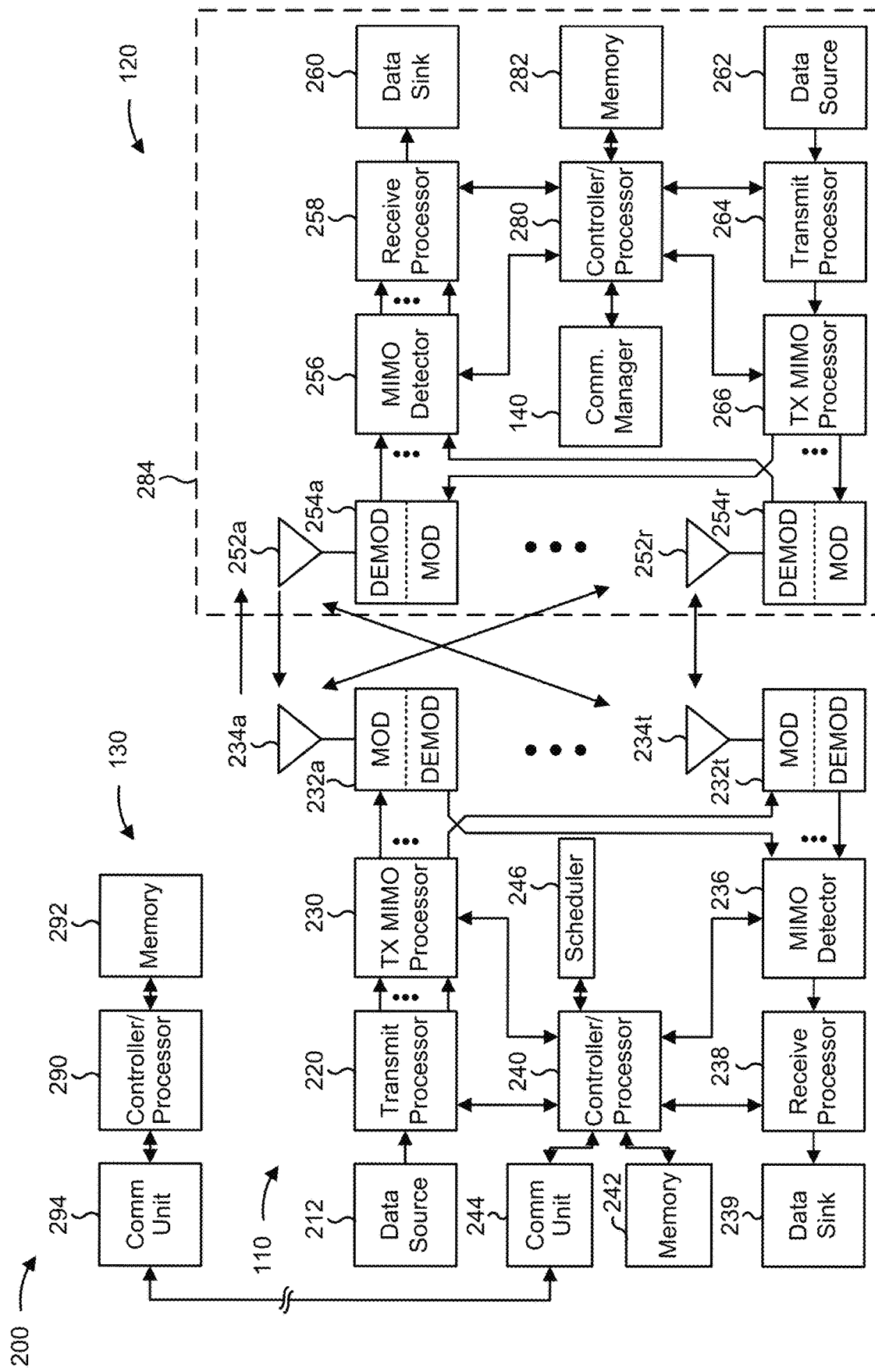
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-11).

The controller/processor 240 of the network node 110, the controller/processor 280 of the UE 120, and/or any other component(s) of FIG. 2 may perform one or more techniques associated with sidelink resource reservation using non-preferred resource signaling, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 (e.g., a transmitter UE) includes means for identifying beamforming information for transmitting a pre-reservation signal that indicates a set of non-preferred resources associated with a data transmission; and/or means for transmitting, to a receiver UE in accordance with the beamforming information, the pre-reservation signal that indicates the set of non-preferred resources associated with the data transmission. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 (e.g., a receiver UE) includes means for receiving, from a transmitter UE, a pre-reservation signal that indicates a set of non-preferred resources associated with a data transmission; and/or means for transmitting an indication of the pre-reservation signal to another receiver UE, or transmitting a conflict indication to the transmitter UE, based at least in part on beamforming information associated with the pre-reservation signal. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
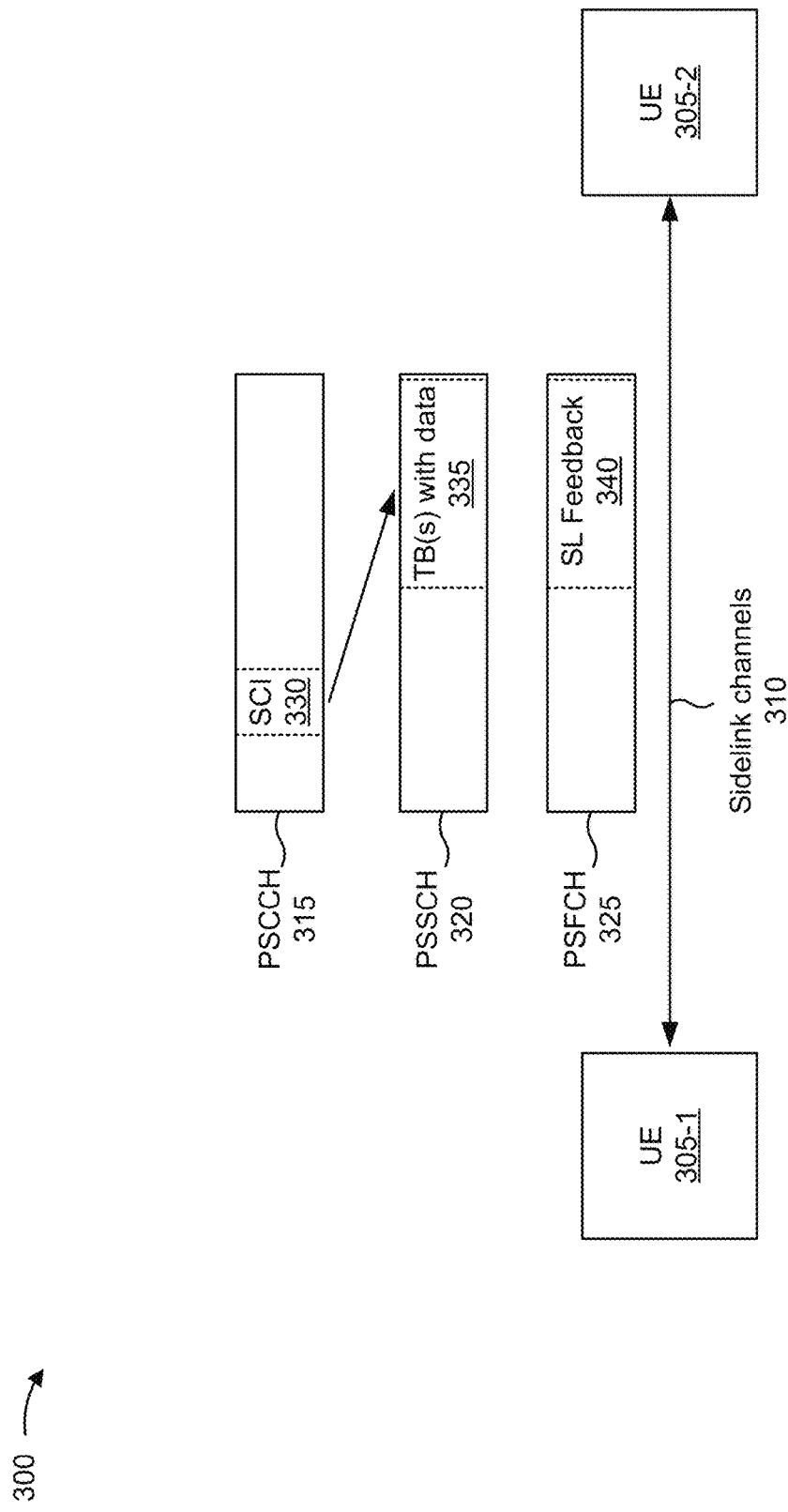
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a network node 110 via an access link or an access channel. The PSSCH 320 may be used to communicate data, similar to a physical downlink shared channel (PDSCH) and/or a physical uplink shared channel (PUSCH) used for cellular communications with a network node 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a network node 110 (e.g., a base station, a CU, or a DU). For example, the UE 305 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 305 may operate using a transmission mode (e.g., Mode 2) where resource selection and/or scheduling is performed by the UE 305 (e.g., rather than a network node 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
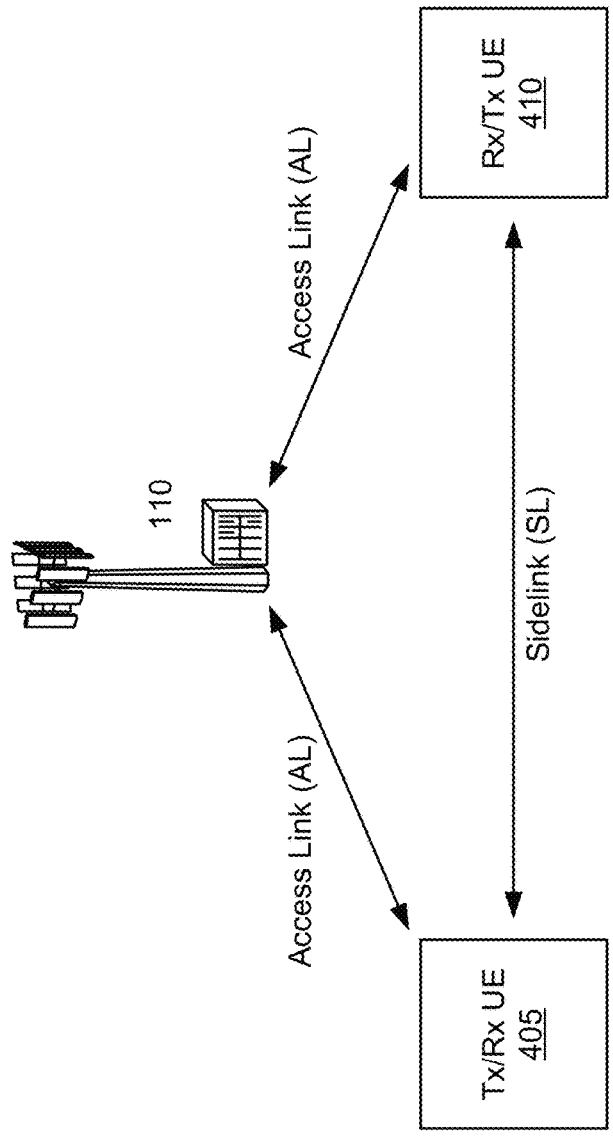
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a network node 110 may communicate with the Tx/Rx UE 405 (e.g., directly or via one or more network nodes), such as via a first access link. Additionally, or alternatively, in some sidelink modes, the network node 110 may communicate with the Rx/Tx UE 410 (e.g., directly or via one or more network nodes), such as via a first access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 4 is provided as an example. Other examples may differ from what is described with respect to FIG. 4.

Figure 5:
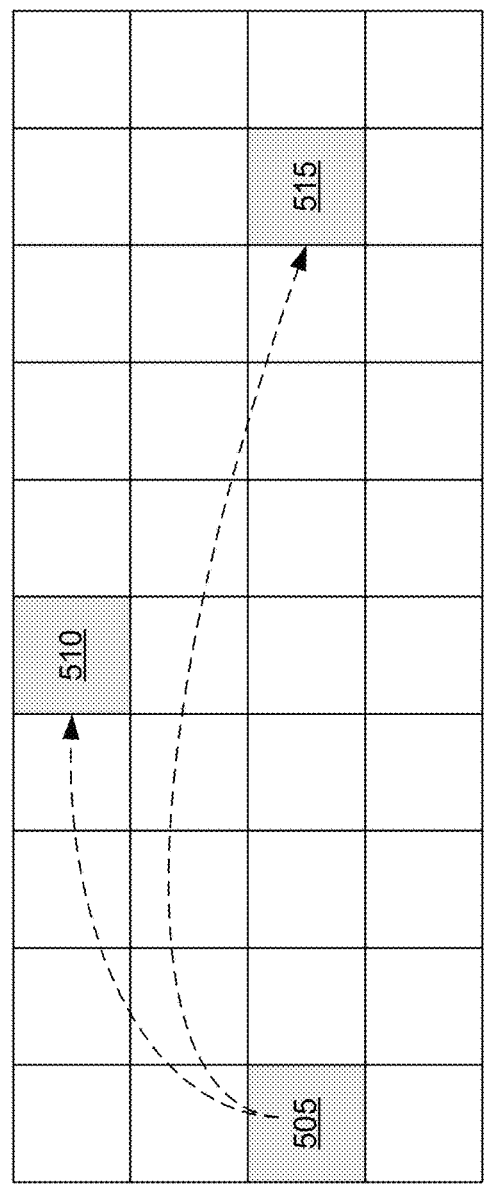
FIG. 5 is a diagram illustrating an example of sidelink resource selection, in accordance with the present disclosure.

FIG. 5 is a diagram illustrating an example 500 of sidelink resource selection, in accordance with the present disclosure. As described herein, sidelink UEs may reserve one or more resources using Mode 2 resource selection. For example, the sidelink UEs may autonomously reserve the sidelink resources without input from a central entity, such as a network node. In some cases, the Mode 2 resource reservation may be based at least in part on transmitter-side sensing. In this case, each sidelink UE may decode SCI when the sidelink UE is not transmitting (or is in a discontinuous reception (DRX) mode or a sensing disabled mode). The SCI that is received from the other sidelink UEs may indicate a current reservation and one or more future reservations. The future resources may be excluded from a set of candidate resources based at least in part on a priority level and/or an RSRP associated with the received SCI.

In some cases, to select the sidelink resources, a transmitter UE may determine a set of candidate resources by decoding (e.g., continuously decoding) SCI from one or more receiver UEs. The SCI may include reservation information, such as one or more resources (e.g., slots and/or resource blocks) that have been reserved by the one or more receiver UEs. If SCI is decoded from a receiver UE having a higher RSRP than the transmitter UE, such as due to interference caused by UE proximity, the transmitter UE may remove all resources indicated in the SCI from the set of candidate resources. The transmitter UE may select (e.g., randomly select) N resources from the set of candidate resources for transmitting a TB. In some cases, for every transmission of the TB, the transmitter UE may reserve one or more resources for one or more respective retransmissions of the TB. For example, the transmitter UE may reserve one or two additional slots for one or two respective retransmissions of the TB. In one example, the transmitter UE may select resource 505 for an initial transmission of the TB. Additionally, the transmitter UE may select resource 510 and/or resource 515 for future retransmission(s) of the TB.

In some cases, sidelink resource allocation (e.g., in accordance with Release 16 of the 3GPP Standards) may result in an initial transmission of the TB being unprotected. In some cases, the initial transmission may collide with another transmission, such as a transmission by another sidelink UE that reserved the same resource. For example, using half-duplex communications, the intended receiver UE may transmit in the same slot that is used for the initial transmission of the TB. In some cases, the Mode 2 resource allocation may have link quality issues, such as due to non-line-of-sight (NLoS) transmissions or larger distances between the UEs, among other examples. This may lead to potential decoding failures of the SCI that carries the reservation information, which may result in collisions when the transmitter UE transmits using one of the previously reserved resources.

In some cases, reliability of the sidelink resource allocation (e.g., in accordance with Release 17 of the 3GPP Standards) may be enhanced by the sharing of sensing and/or reservation information between the UEs. In a first example, a sidelink UE may indicate future resources for other UEs to either transmit on (e.g., preferred resources) or exclude (e.g., non-preferred resources). This information (and/or other reservation information) may be transmitted using an SCI-2 format or a medium access control (MAC) control element (CE) (collectively, MAC-CE). The UEs receiving on the preferred resource may use only the resources in the preferred resource set for transmissions to the UE transmitting on the preferred resource set. The UEs receiving on the non-preferred resource set may exclude the resources from the non-preferred resource set from the set of candidate resources. In a second example, conflict indicators that indicate past or future conflicts may be shared among the sidelink UEs. The sidelink UEs that receive a conflict indicator may reselect resources for transmissions (or retransmissions) of the TB.

As indicated above, FIG. 5 is provided as an example. Other examples may differ from what is described with respect to FIG. 5.

Figure 6:
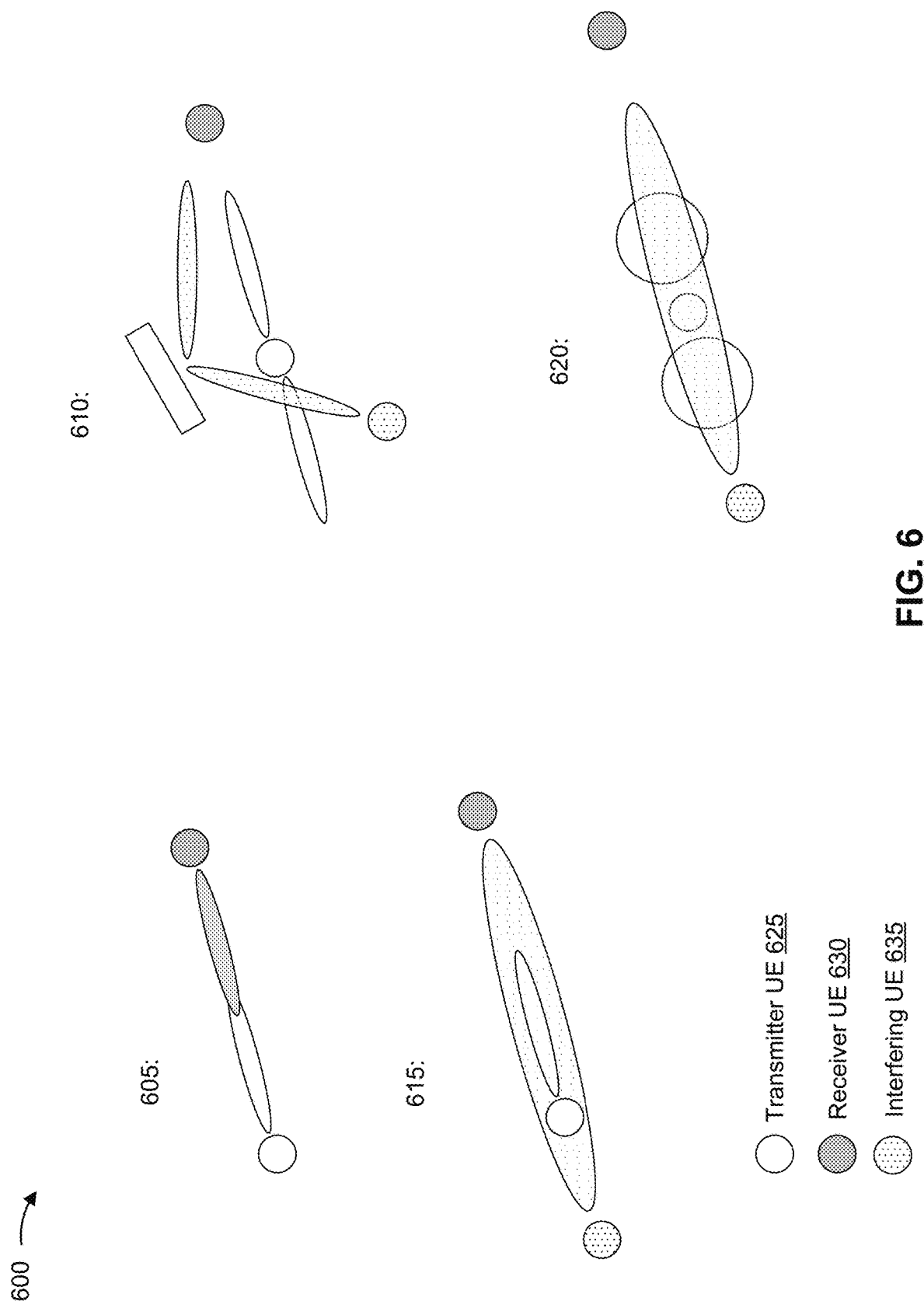
FIG. 6 is a diagram illustrating an example of transmitter-side sensing and receiver-side sensing for sidelink communications, in accordance with the present disclosure.

FIG. 6 is a diagram illustrating an example 600 of transmitter-side sensing and receiver-side sensing for sidelink communications, in accordance with the present disclosure.

In some cases, sidelink communications may occur within the mmWave spectrum. Communications in the mmWave spectrum may have higher path loss than communications in the sub-6 GHz range. In some cases, mmWave communications may require beamforming and/or spatial filtering in order to meet range requirements and/or QoS requirements. In some cases, considering hardware constraints, a sidelink UE may be able to beamform in one or more directions at a time. For a transmitter UE, this may imply that, for a selected beam, the TB being transmitted only reaches users in the angular range of the beam. Similarly, a beamformed receiver may only be able to receive from a narrow angular range (which may result in spatial blindness).

In some cases, transmitter-side resource allocation may be challenging for performing beamformed communications. For example, a sidelink UE may not know which direction an interfering or colliding transmission may come from. This may be especially problematic when there are multiple reflected paths from an interfering UE. In some cases, given the hardware limitations of the sidelink UE (e.g., with respect to analog beamforming), 360-degree sensing may require beam switching (e.g., multiple beam switching). For example, a sensing UE may not be able to detect a reservation when a receiver associated with the sensing UE is beamforming in a different direction than the direction from which the reservation is received. One solution may be broad-beam or omni-directional sensing for mmWave communications. However, the sensing may be limited as mmWave links may have high pathloss. This may lead to the receiver UE not being able to decode reservation information from transmitter UEs (e.g., far and medium range UEs) that are further than a threshold distance from the receiver UE.

Some examples of transmitter-side sensing and receiver-side sensing are shown by reference numbers 605, 610, 615, and 620. As shown by reference number 605, a transmitter UE 625 may communicate with a receiver UE 630. For example, the transmitter UE 625 and the receiver UE 630 may communicate using a transmitter-receiver beam pair link. In this example, the transmitter UE 625 may perform transmitter-side sensing using a transmitter-side sensing beam, and the receiver UE 630 may perform receiver-side sensing using a receiver-side sensing beam.

As shown by reference number 610, an interfering UE 635 may be located behind the transmitter UE 625 (with respect to the receiver UE 630). For example, the transmitter-side sensing beam may be pointed in a direction that is toward the receiver UE 630 but away from the interfering UE 635. In this case, the transmitter UE 625 may not be able to detect one or more reservations that are made by the interfering UE 625. As described herein, this may result in resource collisions, since both the transmitter UE 625 and the interfering UE 635 may reserve the same resource(s) for sidelink transmissions.

As shown by reference number 615, the transmitter UE 625 may have two transmitter-side sensing beams. A first transmitter-side sensing beam may be pointed toward the receiver UE 630 and a second transmitter-side sensing beam may be pointed in the opposite direction. The transmitter UE 625 may be equipped with enhanced hardware capability that includes the two sensing beams. However, as shown in FIG. 6, the interfering UE 635 may not always be located directly behind the transmitter UE 625. For example, the interfering UE 635 may communicate with the receiver UE 630 by reflecting signals off an object. Thus, the transmitter UE 625 may not be able to detect colliding reservations that are made by the interfering UE 635 via the reflected paths.

As shown by reference number 620, the transmitter UE 625 may use wide beam sensing. Wide beam sensing may reduce spatial blindness, but may do so only over a limited range. With transmitter-side and receiver-side beamforming at the interfering UE 635 and the receiver UE 630, the interference may be considerable, even when wide beam or omni-directional sensing is unable to detect it.

Sidelink Mode 2 sensing (e.g., without input from a central entity) may be challenging for beamformed FR2 sidelink UEs. For example, sidelink UEs may only be able to form receiver beams in one direction or a limited number of directions at a time (e.g., due to hardware limitations of the UE for FR2). In some cases, a transmitter UE performing transmitter-side sensing may be unable to decode colliding reservations in SCI. For example, some communication paths may not be in a line of sight of the beam, and it may be difficult for the transmitter UE to sense all possible directions from which interfering signals may arrive. One possible solution is for the transmitter UE to perform wide beam or omni-directional sensing. However, this may reduce the range over which the signals are sensed. When the transmitter UE fails to detect or decode colliding reservations in the SCI, multiple transmissions may occur on the same resource, thereby resulting in reduced transmission reliability.

Techniques and apparatuses are described herein for sidelink resource reservation using non-preferred resource signaling. In some aspects, a transmitter UE may identify beamforming information for transmitting a pre-reservation signal that indicates a set of non-preferred resources associated with a data transmission. The transmitter UE may transmit the pre-reservation signal to a receiver UE in accordance with the beamforming information. In some aspects, transmitting the pre-reservation signal in accordance with the beamforming information may include transmitting the pre-reservation signal a select number of slots before the data transmission or before an earliest non-preferred resource, or may include transmitting the pre-reservation signal a select number of slots after a transmitter UE sensing window. The receiver UE may transmit an indication of the pre-reservation signal to another receiver UE and/or may transmit a conflict indication to the transmitter UE based at least in part on the beamforming information associated with the pre-reservation signal.

As described above, sidelink Mode 2 sensing may be challenging for beamformed FR2 sidelink UEs. A transmitter UE performing sensing may be unable to decode colliding reservations in SCI. For example, some communication paths may not be in a line of sight of the beam, and it may be difficult for the transmitter UE to sense all possible directions from which interfering signals may arrive. When the transmitter UE fails to detect or decode colliding reservations in the SCI, multiple transmissions may occur on the same resource, thereby resulting in reduced transmission reliability. Using the techniques and apparatuses described herein, the transmitter UE may identify beamforming information for transmitting a pre-reservation signal that indicates a set of non-preferred resources associated with a data transmission, and may transmit the pre-reservation signal to a receiver UE in accordance with the beamforming information. The receiver UE may transmit an indication of the pre-reservation signal to another receiver UE and/or may transmit a conflict indication to the transmitter UE based at least in part on the beamforming information associated with the pre-reservation signal. This may reduce the likelihood of transmission collisions, therefore improving transmission reliability between the UEs. In particular, this may reduce the likelihood of transmission collisions and improve the transmission reliability in mmWave sidelink communications, and may reduce power consumption by eliminating (or reducing) the need for continuous sensing. Additional details are described herein.

As indicated above, FIG. 6 is provided as an example. Other examples may differ from what is described with respect to FIG. 6.

Figure 7:
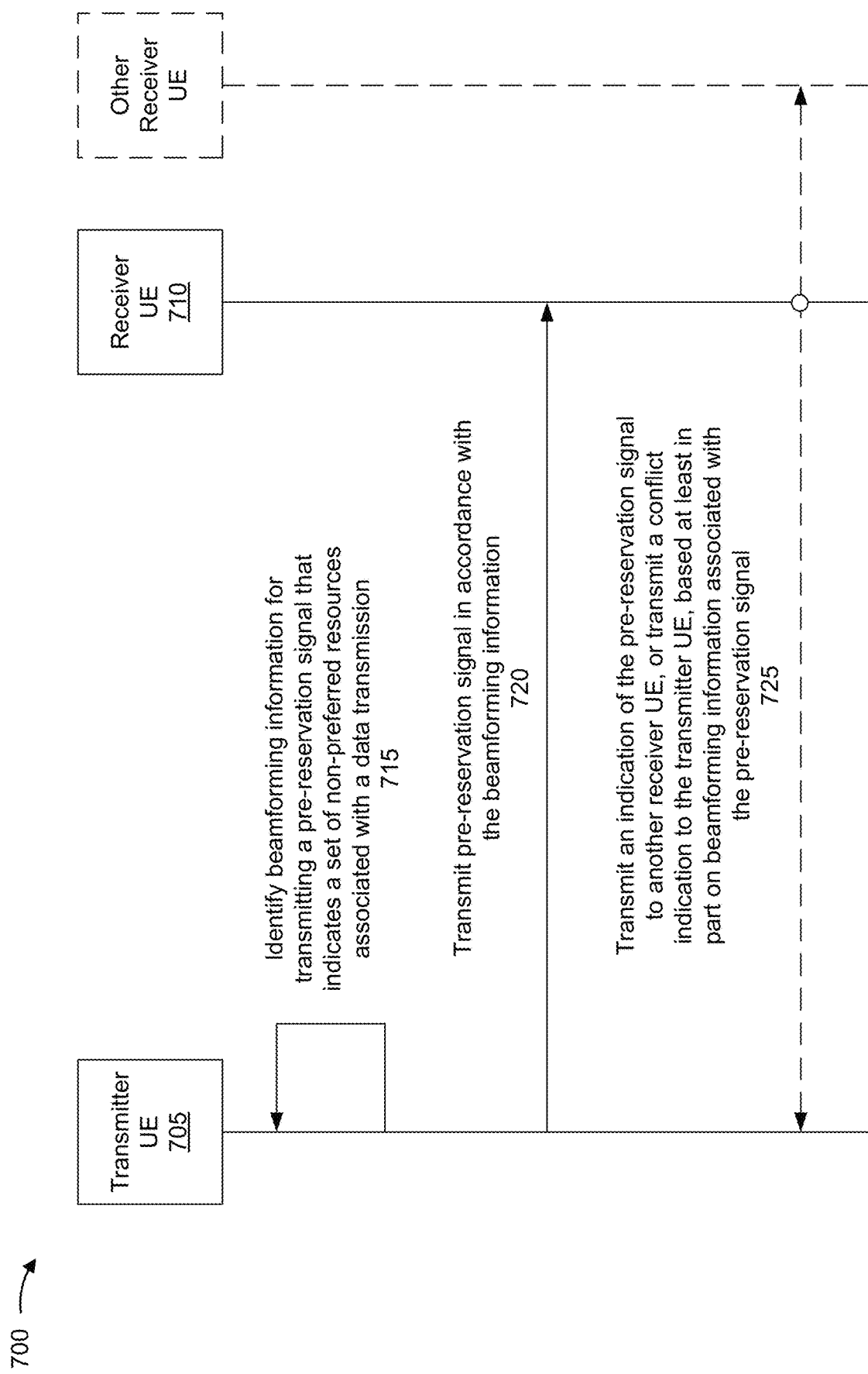
FIG. 7 is a diagram illustrating an example of sidelink resource reservation using non-preferred resource signaling, in accordance with the present disclosure.

FIG. 7 is a diagram illustrating an example 700 of sidelink resource reservation using non-preferred resource signaling, in accordance with the present disclosure. A transmitter UE 705 may communicate with a receiver UE 710. The transmitter UE 705 and the receiver UE 710 may include some or all of the features of the UE 120, UE 305, UE 405, and/or UE 410. In some aspects, the transmitter UE 705 and the receiver UE 710 may communicate using the mmWave band or a portion of the mmWave band.

As shown by reference number 715, the transmitter UE 705 may identify beamforming information for transmitting a pre-reservation signal. The pre-reservation signal may indicate a set of non-preferred resources associated with a data transmission. In some aspects, the transmitter UE 705 (operating over the mmWave band) may transmit the set of non-preferred resources before the data transmission, such as before a transmission of a data packet. The set of non-preferred resources may include an indication of one or more resources that are to be used for the data transmission. Additionally, or alternatively, the set of non-preferred resources may include an indication of one or more other non-preferred resources that are selected based at least in part on a transmit beam direction, a beam link interference, or an in-band emission estimate, among other examples.

In some aspects, identifying the beamforming information for transmitting the pre-reservation signal may include performing a beam selection for transmitting the pre-reservation signal. In some aspects, the transmitter UE 705 may be configured to determine one or more precoders to be used for transmitting the pre-reservation signal. In some aspects, the beam selection may be performed based at least in part on a UE configuration (e.g., pre-configuration). In one example, the configuration may indicate for the transmitter UE 705 to always transmit the pre-reservation signal over a beam or a precoder that is quasi co-located with the transmit beam. For example, the configuration may indicate for the transmitter UE 705 to transmit the pre-reservation signal using a same beam that is to be used for the data transmission or to transmit the pre-reservation signal using a wider beam that is pointing in the same direction as the beam that is to be used for the data transmission. In another example, the configuration may indicate a set of beams over which the pre-reservation signal may be transmitted. For example, the set of beams may include all possible beams (e.g., using an exhaustive sweep). In another example, the configuration may indicate for the transmitter UE 705 to transmit the pre-reservation signal omni-directionally. Additional details regarding these features are described in connection with FIG. 8.

In some aspects, the beamforming information may indicate an association between the data transmission beam and the beam for transmitting the pre-reservation signal. The association may be specified in terms of a quasi co-location (QCL) relationship (between the data transmission beam and the beam for transmitting the pre-reservation signal) and/or transmission configuration indicator (TCI) state identifiers associated with the data transmission beam and the beam for transmitting the pre-reservation signal. In some aspects, the beams for transmitting the pre-reservation signal may be determined based at least in part on UE implementation, based at least in part on a time restriction that is imposed by UE processing capabilities, and/or based at least in part on a time restriction associated with the data transmission. For example, the processing timelines and/or the availability of transmission beams within the time window may be used to determine the number of directions and/or transmission precoders over which the pre-reservation signal can be transmitted.

In some aspects, the transmitter UE 705 may determine a beam prioritization for a plurality of beams that can be used for transmitting the pre-reservation signal. The time window for transmitting the pre-reservation signal may not allow for the pre-reservation signal to be transmitted omni-directionally. In some aspects, the transmitter UE 705 may be configured with priority information associated with one or more of the plurality of beams for transmitting the pre-reservation signal. In some aspects, a beam relationship may be specified between two or more beams of the plurality of beams, and the transmitter UE 705 may be configured with priority information associated with one or more beam directions. In some aspects, an implementation of the transmitter UE 705 may indicate one or more priorities or ranks associated with the beam directions for transmitting the pre-reservation signal.

As shown by reference number 720, the transmitter UE 705 may transmit, to the receiver UE 710 and in accordance with the beamforming information, the pre-reservation signal that indicates the set of non-preferred resources associated with the data transmission. In some aspects, the pre-reservation signal may be transmitted in a standalone manner. For example, the pre-reservation signal may not be multiplexed with other data, such as a current data transmission. In this case, the transmitter UE 705 may transmit SCI or a MAC-CE (or a combination of SCI and a MAC-CE) to the receiver UE 710 that includes an indication of the pre-reservation signal, where the pre-reservation signal is not multiplexed with other data. In some aspects, when the pre-reservation signal is transmitted as the combination of the SCI and the MAC-CE, a portion of the non-preferred resource set may be indicates in the SCI and another portion (e.g., a remaining portion) of the non-preferred resource set may be indicated in the MAC-CE. The split between SCI and the MAC-CE may be based may least in part on a priority of the data that is scheduled or expected over the resources. Additionally, or alternatively, the M earliest resources may be indicated in the SCI, where M is based at least in part on the maximum size of the SCI. In some aspects, the pre-reservation signal may be transmitted in accordance with one or more configured (e.g., pre-configured) directions. In some aspects, the pre-reservation signal may be transmitted in accordance with a UE implementation. In some aspects, the pre-reservation signal may be transmitted across all beam directions, such as using a full beam sweep or an omni-directional beam sweep. In some aspects, the pre-reservation signal may be multiplexed with a current (e.g., ongoing) data transmission. For example, the transmitter UE 705 may transmit a MAC-CE to the receiver UE 710 that includes a pre-reservation signal that is multiplexed with the current data transmission. In this case, the pre-reservation signal may be transmitted in the same direction as the data associated with the current data transmission. In some aspects, the pre-reservation signal may be transmitted a select number of slots before the actual data transmission or before the earliest indicated non-preferred resource set. In some other aspects, the pre-reservation signal may be transmitted a select number of slots after a transmitter UE sensing window. Additional details regarding these features are described in connection with FIG. 8.

As shown by reference number 725, the receiver UE 710 may transmit an indication of the pre-reservation signal to another receiver UE, or may transmit a conflict indication to the transmitter UE 705, based at least in part on beamforming information associated with the pre-reservation signal.

In some aspects, the receiver UE 710 may use the pre-reservation signal for selecting one or more resources for a future data transmission by the receiver UE 710. For example, the receiver UE 710 may select the one or more resources for the future data transmission based at least in part on a received RSRP value and/or a beam direction over which the pre-reservation signal is received. In some aspects, the receiver UE 710 may relay or retransmit the set of non-preferred resources indicated by the pre-reservation signal. For example, the receiver UE 710 may perform resource exclusion and may relay or retransmit the set of non-preferred resources to another receiver UE over one or more beam directions. In one example, the one or more beam directions may be determined based at least in part on the beam(s) over which the pre-reservation signal was received. In another example, the one or more beam directions and a transmission precoder may be determined based at least in part on a signal power and/or a signal quality of the pre-reservation signal. In another example, the one or more beam directions may be determined based at least in part on timing information, such as a time remaining to an earliest resource or a latest resource indicated in the resource set and a processing time associated with the receiver UE 710. For example, the receiver UE 710 may perform a full beam sweep based at least in part on the timing information indicating enough time for the full beam sweep to be performed, but may only select some of the beams (e.g., based on a priority of the beams) based at least in part on the timing information indicating not enough time for the full beam sweep to be performed. In some aspects, the receiver UE 710 may determine to relay or retransmit the pre-reservation signal to the other receiver UE based at least in part on one or more conditions. For example, the receiver UE 710 may relay or retransmit the pre-reservation signal to the other receiver UE based at least in part on the pre-reservation signal being received from a UE that the receiver UE 710 intends to receive from, based at least in part on comparing an RSRP or an RSRQ of the pre-reservation signal to a threshold (for example, per-priority), and/or based at least in part on a received beam direction (for example, combining matrix), among other examples.

In some aspects, the receiver UE 710 may determine that one or more of the resources included in the set of non-preferred resources may conflict with an existing transmission. In some aspects, the receiver UE 710 may transmit an indication of the conflict to the transmitter UE 705 based at least in part on the transmitter UE 705 having a same priority or a lower priority than a UE that previously reserved the one or more resources. The conflict indication may include an indication of the one or more resources that are in conflict. In some aspects, the resource that is used to transmit the conflict indication may be the same resource over which the pre-reservation signal is transmitted. In some aspects, the transmitting of the conflict indication by the receiver UE 710 may be enabled or disabled by configuration signaling, such as signaling that occurs across a resource pool or across a network.

As described above, sidelink Mode 2 sensing may be challenging for beamformed FR2 sidelink UEs. A transmitter UE 705 performing sensing may be unable to decode colliding reservations in SCI. For example, some communication paths may not be in a line of sight of the beam, and it may be difficult for the transmitter UE 705 to sense all possible directions from which interfering signals may arrive. When the transmitter UE 705 fails to detect or decode colliding reservations in the SCI, multiple transmissions may occur on the same resource, thereby resulting in reduced transmission reliability. Using the techniques and apparatuses described herein, the transmitter UE 705 may identify beamforming information for transmitting a pre-reservation signal that indicates a set of non-preferred resources associated with a data transmission, and may transmit the pre-reservation signal to a receiver UE 710 in accordance with the beamforming information. The receiver UE 710 may receive the pre-reservation signal, and may transmit an indication of the pre-reservation signal to another receiver UE and/or may transmit a conflict indication to the transmitter UE 705 based at least in part on beamforming information associated with the pre-reservation signal. This may reduce the likelihood of transmission collisions, therefore improving transmission reliability between the UEs. In particular, this may reduce the likelihood of transmission collisions and improve the transmission reliability in sidelink mmWave communications, and may reduce power consumption by eliminating (or reducing) the need for continuous sensing. In one example, the beamforming methods described herein may improve the signal quality for mmWave transmissions over distances of tens or hundreds of meters.

As indicated above, FIG. 7 is provided as an example. Other examples may differ from what is described with respect to FIG. 7.

Figure 8:
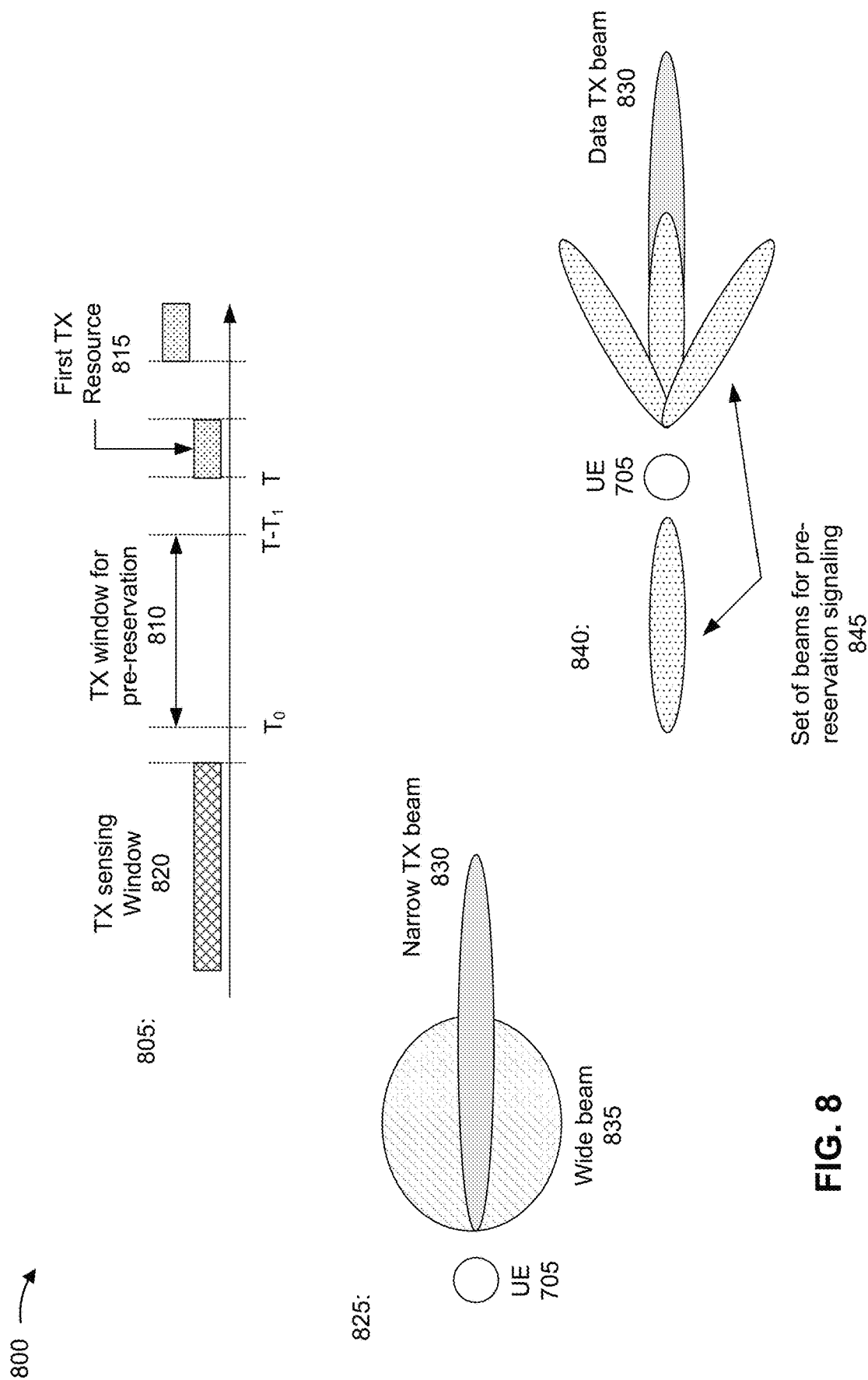
FIG. 8 is a diagram illustrating examples of resource signaling, in accordance with the present disclosure.

FIG. 8 is a diagram illustrating examples 800 of resource signaling, in accordance with the present disclosure. As shown by reference number 805, the transmitter UE 705 may transmit a pre-reservation signal to the receiver UE 710 during a TX window for pre-reservation 810. In some aspects, the pre-reservation signal may be transmitted a select number of slots before an associated data transmission (or before an earliest indicated non-preferred resource set). For example, a first TX resource 815 may be received at time T, and the pre-reservation signal may be transmitted at time T−1 before the transmission of the first TX resource 815. In some aspects, the pre-reservation signal may be transmitted a select number of slots after a transmitter UE sensing window. For example, the pre-reservation signal may be transmitted at time $T_0$ after the TX sensing window 820. As shown by reference number 825, the transmitter UE 705 may perform a data transmission using narrow TX beam 830. A UE configuration may indicate for the transmitter UE 705 to transmit the pre-reservation signal over a beam that is quasi co-located with the narrow TX beam 830, such as wide beam 835. In some aspects, the configuration may indicate for the transmitter UE 705 to transmit the pre-reservation signal using a same beam that is to be used for the data transmission (such as narrow TX beam 830) or to transmit the pre-reservation signal using a wider beam that is pointing in the same direction as the beam that is to be used for the data transmission (such as wide beam 835). As shown by reference number 840, the UE configuration may indicate a set of beams over which the pre-reservation signal may be transmitted, such as the set of beams for pre-reservation signaling 845. The set of beams may include all possible beams (e.g., using an exhaustive sweep). In some aspects, the set of beams for pre-reservation signaling 845 may be a set of beams associated with a PSSCH TX beam.

As indicated above, FIG. 8 is provided as an example. Other examples may differ from what is described with respect to FIG. 8.

Figure 9:
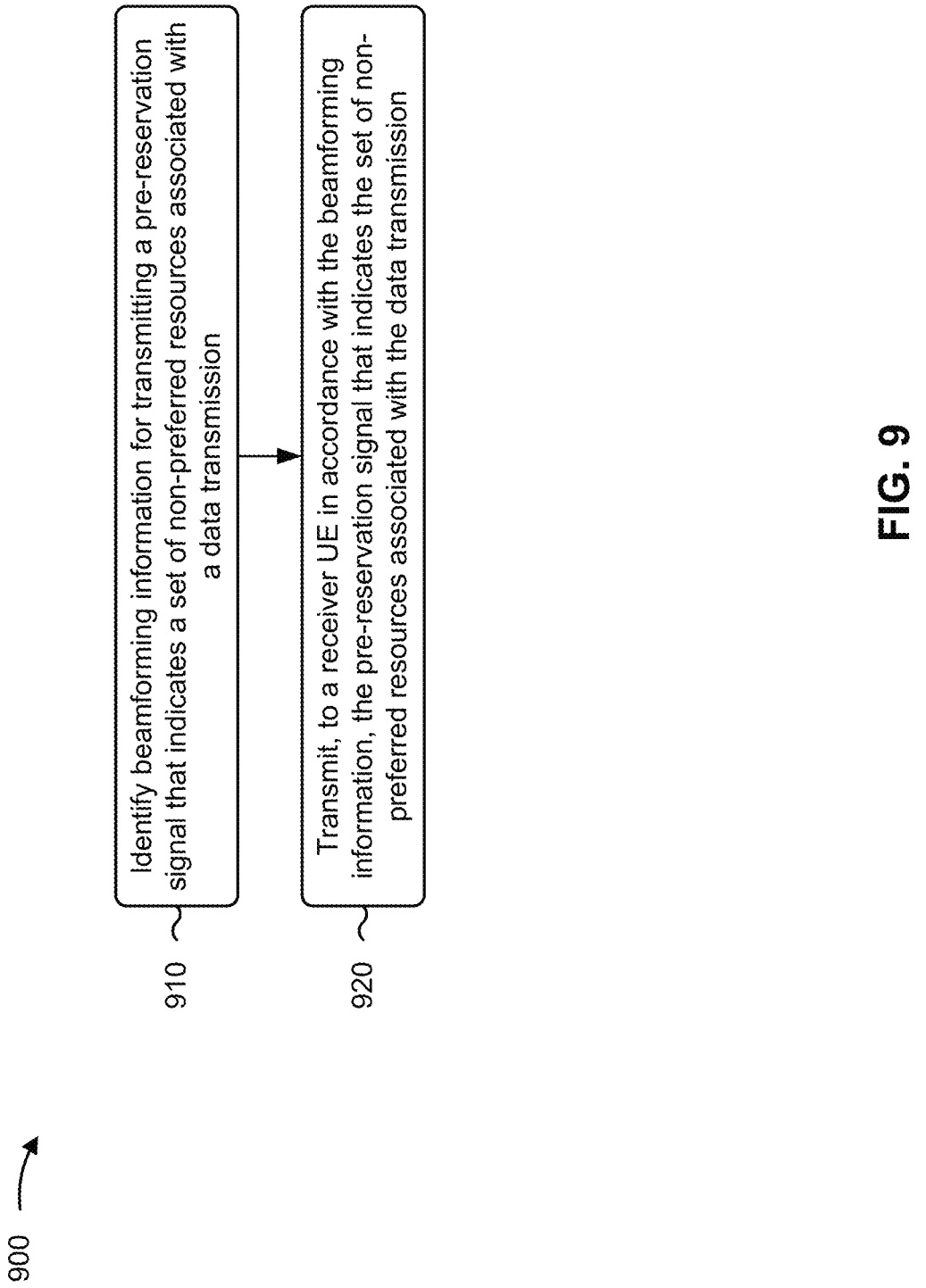
FIG. 9 is a diagram illustrating an example process performed, for example, by a transmitter UE, in accordance with the present disclosure.

FIG. 9 is a diagram illustrating an example process 900 performed, for example, by a transmitter UE, in accordance with the present disclosure. Example process 900 is an example where the UE (e.g., UE 120) performs operations associated with sidelink resource reservation using non-preferred resource signaling.

As shown in FIG. 9, in some aspects, process 900 may include identifying beamforming information for transmitting a pre-reservation signal that indicates a set of non-preferred resources associated with a data transmission (block 910). For example, the UE (e.g., using communication manager 140 and/or identification component 1108, depicted in FIG. 11) may identify beamforming information for transmitting a pre-reservation signal that indicates a set of non-preferred resources associated with a data transmission, as described above.

As further shown in FIG. 9, in some aspects, process 900 may include transmitting, to a receiver UE in accordance with the beamforming information, the pre-reservation signal that indicates the set of non-preferred resources associated with the data transmission (block 920). For example, the UE (e.g., using communication manager 140 and/or transmission component 1104, depicted in FIG. 11) may transmit, to a receiver UE in accordance with the beamforming information, the pre-reservation signal that indicates the set of non-preferred resources associated with the data transmission, as described above.

Process 900 may include additional aspects, such as any single aspect or any combination of aspects described below and/or in connection with one or more other processes described elsewhere herein.

In a first aspect, the set of non-preferred resources associated with the data transmission includes one or more resources that are to be used for the data transmission.

In a second aspect, alone or in combination with the first aspect, the set of non-preferred resources associated with the data transmission includes one or more other non-preferred resources that are based at least in part on a transmitter beam direction, a beam link interference, or an in-band emission estimate.

In a third aspect, alone or in combination with one or more of the first and second aspects, transmitting the pre-reservation signal comprises transmitting SCI or a MAC message that includes the pre-reservation signal, wherein the pre-reservation signal is not multiplexed with a current data transmission.

In a fourth aspect, alone or in combination with one or more of the first through third aspects, transmitting the pre-reservation signal in accordance with the beamforming information comprises transmitting the pre-reservation signal in one or more directions according to a transmitter UE configuration, transmitting the pre-reservation signal in one or more directions according to a UE implementation, or transmitting the pre-reservation signal across all possible beam directions.

In a fifth aspect, alone or in combination with one or more of the first through fourth aspects, transmitting the pre-reservation signal comprises transmitting a MAC message that includes the pre-reservation signal, wherein the pre-reservation signal is multiplexed with a current data transmission and is transmitted in a same direction as the current data transmission.

In a sixth aspect, alone or in combination with one or more of the first through fifth aspects, transmitting the pre-reservation signal comprises transmitting the pre-reservation signal a first number of slots before the data transmission or before an earliest non-preferred resource of the set of non-preferred resources, or transmitting the pre-reservation signal a second select number of slots after a sensing window associated with the transmitter UE.

In a seventh aspect, alone or in combination with one or more of the first through sixth aspects, process 900 includes selecting one or more precoders to be used for transmitting the pre-reservation signal.

In an eighth aspect, alone or in combination with one or more of the first through seventh aspects, identifying the beamforming information for transmitting the pre-reservation signal comprises identifying the beamforming information based at least in part on configuration information, wherein the configuration information includes information that indicates for the transmitter UE to transmit the pre-reservation signal over a beam or a precoder that is quasi co-located with a transmitter beam that is to be used for the data transmission, information that indicates a set of beams over which the pre-reservation signal can be transmitted based at least in part on the transmitter beam, or information that indicates to transmit the pre-reservation signal using an omni-directional transmission.

In a ninth aspect, alone or in combination with one or more of the first through eighth aspects, identifying the beamforming information comprises identifying an association between a transmitter beam associated with the data transmission and a reservation beam associated with the pre-reservation signal, wherein the association between the transmitter beam and the reservation beam is indicated using a quasi co-location relationship and one or more transmission configuration indicator state identifiers.

In a tenth aspect, alone or in combination with one or more of the first through ninth aspects, identifying the beamforming information comprises identifying one or more reservation beams for transmitting the pre-reservation signal based at least in part on a transmitter UE implementation and a time restriction associated with a processing capability of the transmitter UE.

In an eleventh aspect, alone or in combination with one or more of the first through tenth aspects, identifying the beamforming information comprises identifying beam prioritization information based at least in part on a time window for transmitting the pre-reservation signal.

In a twelfth aspect, alone or in combination with one or more of the first through eleventh aspects, the beam prioritization information indicates priority information for one or more beam directions.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
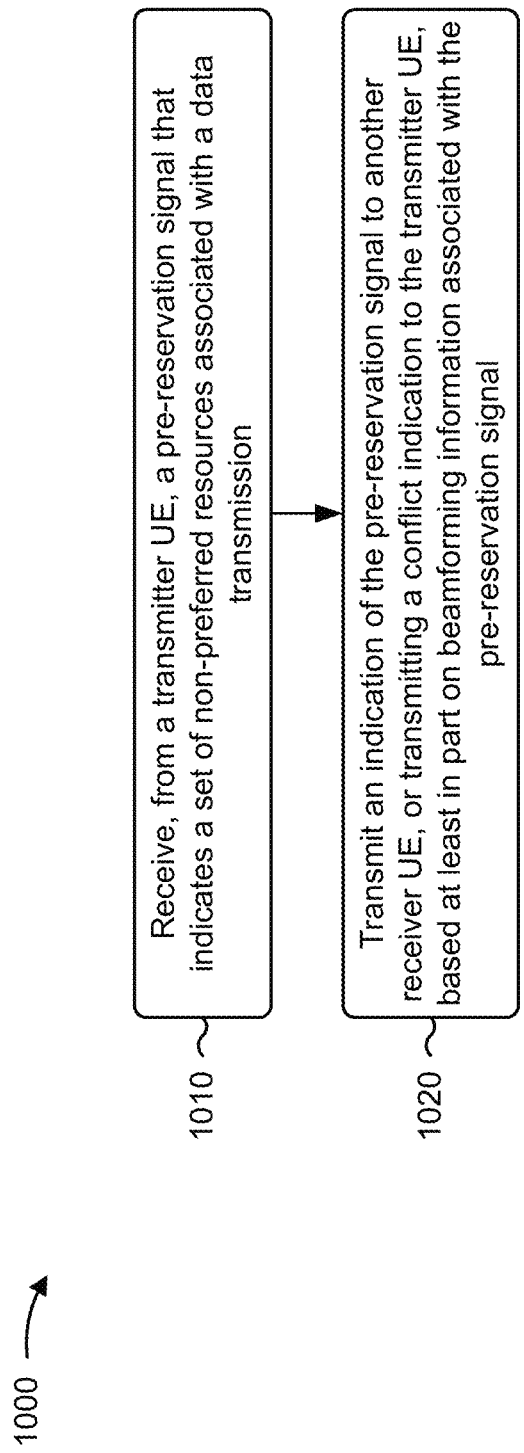
FIG. 10 is a diagram illustrating an example process performed, for example, by a receiver UE, in accordance with the present disclosure.

FIG. 10 is a diagram illustrating an example process 1000 performed, for example, by a receiver UE, in accordance with the present disclosure. Example process 1000 is an example where the UE (e.g., UE 120) performs operations associated with sidelink resource reservation using non-preferred resource signaling.

As shown in FIG. 10, in some aspects, process 1000 may include receiving, from a transmitter UE, a pre-reservation signal that indicates a set of non-preferred resources associated with a data transmission (block 1010). For example, the UE (e.g., using communication manager 140 and/or reception component 1102, depicted in FIG. 11) may receive, from a transmitter UE, a pre-reservation signal that indicates a set of non-preferred resources associated with a data transmission, as described above.

As further shown in FIG. 10, in some aspects, process 1000 may include transmitting an indication of the pre-reservation signal to another receiver UE, or transmitting a conflict indication to the transmitter UE, based at least in part on beamforming information associated with the pre-reservation signal (block 1020). For example, the UE (e.g., using communication manager 140 and/or transmission component 1104, depicted in FIG. 11) may transmit an indication of the pre-reservation signal to another receiver UE, or transmitting a conflict indication to the transmitter UE, based at least in part on beamforming information associated with the pre-reservation signal, as described above.

Process 1000 may include additional aspects, such as any single aspect or any combination of aspects described below and/or in connection with one or more other processes described elsewhere herein.

In a first aspect, process 1000 includes selecting one or more resources to be used for a data transmission by the receiver UE based at least in part on a reference signal received power indicator and a beam direction associated with receiving the pre-reservation signal.

In a second aspect, alone or in combination with the first aspect, selecting the one or more resources to be used for the data transmission by the receiver UE comprises performing a resource exclusion operation based at least in part on the set of non-preferred resources.

In a third aspect, alone or in combination with one or more of the first and second aspects, transmitting the indication of the pre-reservation signal to the other receiver UE comprises transmitting an indication of the set of non-preferred resources to the receiver UE over one or more beam directions.

In a fourth aspect, alone or in combination with one or more of the first through third aspects, process 1000 includes determining the one or more beam directions for transmitting the indication of the set of non-preferred resources to the receiver UE, wherein determining the one or more beam directions comprises determining the one or more beam directions based at least in part on one or more beams associated with receiving the pre-reservation signal, determining the one or more beam directions and a transmission precoder based at least in part on a signal power or signal quality associated with receiving the pre-reservation signal, or determining the one or more beam directions based at least in part on a time remaining to an earliest resource or a latest resource indicated in the set of non-preferred resources and a processing time associated with the receiver UE.

In a fifth aspect, alone or in combination with one or more of the first through fourth aspects, process 1000 includes determining whether to transmit the indication of the pre-reservation signal to the other receiver UE based at least in part on the transmitter UE being a UE from which the receiver UE is configured to receive the pre-reservation signal, based at least in part on comparing a reference signal received power or a reference signal received quality of the pre-reservation signal to a threshold, or based at least in part on a beam direction that is used for receiving the pre-reservation signal.

In a sixth aspect, alone or in combination with one or more of the first through fifth aspects, process 1000 includes determining whether to transmit the conflict indication to the transmitter UE based at least in part on identifying a potential collision associated with one or more resources that are included in the set of non-preferred resources.

In a seventh aspect, alone or in combination with one or more of the first through sixth aspects, process 1000 includes transmitting the conflict indication to the transmitter UE based at least in part on the transmitter UE having a same priority or a lower priority than a UE that previously reserved the one or more resources that are included in the set of non-preferred resources.

In an eighth aspect, alone or in combination with one or more of the first through seventh aspects, the conflict indication includes an indication of the one or more resources that are included in the set of non-preferred resources.

In a ninth aspect, alone or in combination with one or more of the first through eighth aspects, transmitting the conflict indication to the transmitter UE comprises transmitting the conflict indication to the transmitter UE using a resource that was used by the transmitter UE for transmitting the pre-reservation signal.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
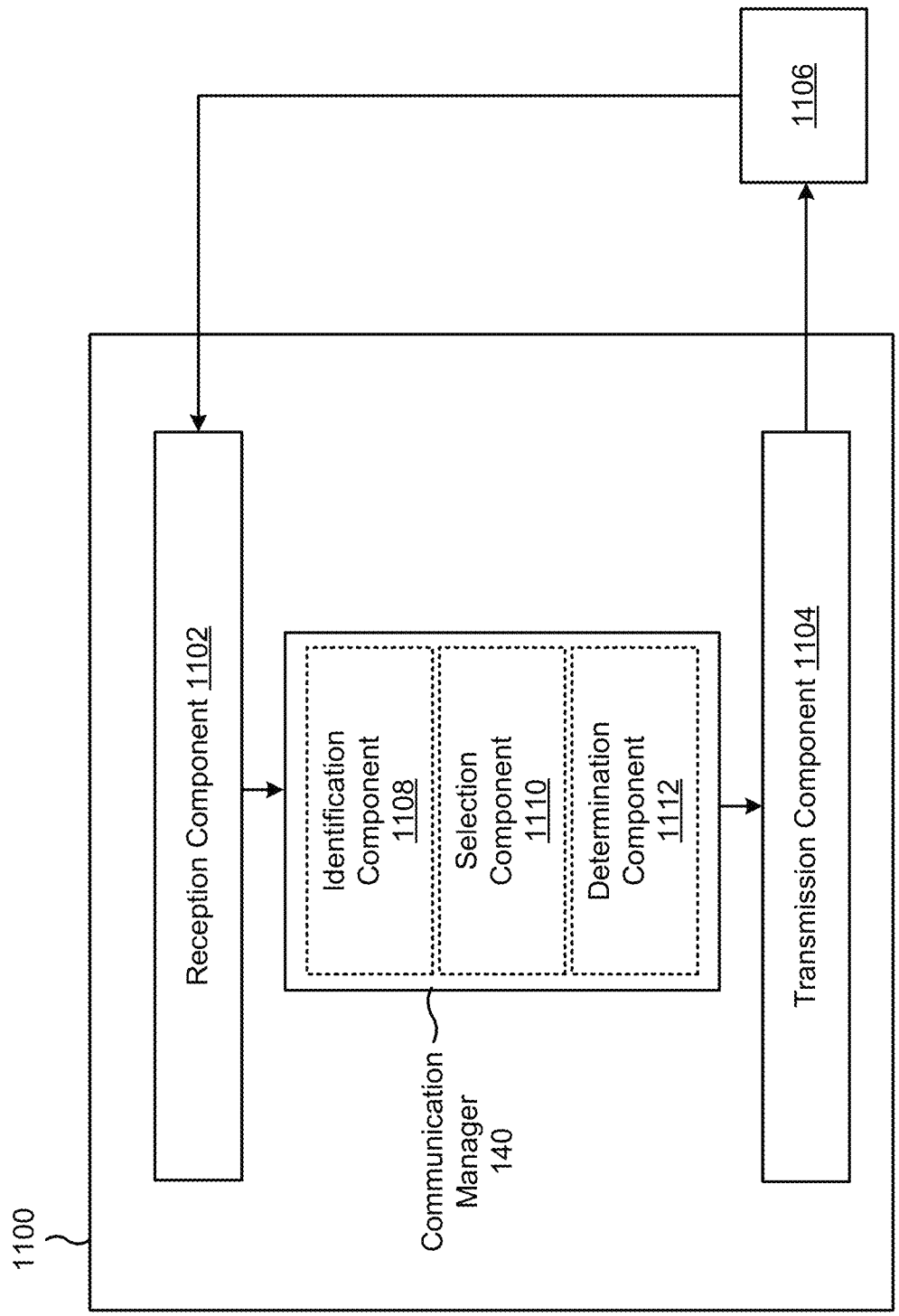
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an identification component 1108, a selection component 1110, or a determination component 1112, among other examples.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The identification component 1108 may identify beamforming information for transmitting a pre-reservation signal that indicates a set of non-preferred resources associated with a data transmission. The transmission component 1104 may transmit, to a receiver UE in accordance with the beamforming information, the pre-reservation signal that indicates the set of non-preferred resources associated with the data transmission. The selection component 1110 may select one or more precoders to be used for transmitting the pre-reservation signal.

The reception component 1102 may receive, from a transmitter UE, a pre-reservation signal that indicates a set of non-preferred resources associated with a data transmission. The transmission component 1104 may transmit an indication of the pre-reservation signal to another receiver UE, or transmitting a conflict indication to the transmitter UE, based at least in part on beamforming information associated with the pre-reservation signal. The selection component 1110 may select one or more resources to be used for a data transmission by the receiver UE based at least in part on a reference signal received power indicator and a beam direction associated with receiving the pre-reservation signal.

The determination component 1112 may determine the one or more beam directions for transmitting the indication of the set of non-preferred resources to the receiver UE, wherein determining the one or more beam directions comprises determining the one or more beam directions based at least in part on one or more beams associated with receiving the pre-reservation signal; determining the one or more beam directions and a transmission precoder based at least in part on a signal power or signal quality associated with receiving the pre-reservation signal; or determining the one or more beam directions based at least in part on a time remaining to an earliest resource or a latest resource indicated in the set of non-preferred resources and a processing time associated with the receiver UE.

The determination component 1112 may determine whether to transmit the indication of the pre-reservation signal to the other receiver UE based at least in part on the transmitter UE being a UE from which the receiver UE is configured to receive the pre-reservation signal, based at least in part on comparing a reference signal received power or a reference signal received quality of the pre-reservation signal to a threshold, or based at least in part on a beam direction that is used for receiving the pre-reservation signal.

The determination component 1112 may determine whether to transmit the conflict indication to the transmitter UE based at least in part on identifying a potential collision associated with one or more resources that are included in the set of non-preferred resources. The transmission component 1104 may transmit the conflict indication to the transmitter UE based at least in part on the transmitter UE having a same priority or a lower priority than a UE that previously reserved the one or more resources that are included in the set of non-preferred resources.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a transmitter user equipment (UE), comprising: identifying beamforming information for transmitting a pre-reservation signal that indicates a set of non-preferred resources associated with a data transmission; and transmitting, to a receiver UE in accordance with the beamforming information, the pre-reservation signal that indicates the set of non-preferred resources associated with the data transmission.

Aspect 2: The method of Aspect 1, wherein the set of non-preferred resources associated with the data transmission includes one or more resources that are to be used for the data transmission.

Aspect 3: The method of any of Aspects 1-2, wherein the set of non-preferred resources associated with the data transmission includes one or more other non-preferred resources that are based at least in part on a transmitter beam direction, a beam link interference, or an in-band emission estimate.

Aspect 4: The method of any of Aspects 1-3, wherein transmitting the pre-reservation signal comprises transmitting sidelink control information (SCI) or a medium access control (MAC) message that includes the pre-reservation signal, wherein the pre-reservation signal is not multiplexed with a current data transmission.

Aspect 5: The method of Aspect 4, wherein transmitting the pre-reservation signal in accordance with the beamforming information comprises transmitting the pre-reservation signal in one or more directions according to a transmitter UE configuration, transmitting the pre-reservation signal in one or more directions according to a UE implementation, or transmitting the pre-reservation signal across all possible beam directions.

Aspect 6: The method of any of Aspects 1-5, wherein transmitting the pre-reservation signal comprises transmitting a medium access control (MAC) message that includes the pre-reservation signal, wherein the pre-reservation signal is multiplexed with a current data transmission and is transmitted in a same direction as the current data transmission.

Aspect 7: The method of any of Aspects 1-6, wherein transmitting the pre-reservation signal comprises transmitting the pre-reservation signal a first number of slots before the data transmission or before an earliest non-preferred resource of the set of non-preferred resources, or transmitting the pre-reservation signal a second select number of slots after a sensing window associated with the transmitter UE.

Aspect 8: The method of any of Aspects 1-7, further comprising selecting one or more precoders to be used for transmitting the pre-reservation signal.

Aspect 9: The method of any of Aspects 1-8, wherein identifying the beamforming information for transmitting the pre-reservation signal comprises identifying the beamforming information based at least in part on configuration information, wherein the configuration information includes: information that indicates for the transmitter UE to transmit the pre-reservation signal over a beam or a precoder that is quasi co-located with a transmitter beam that is to be used for the data transmission; information that indicates a set of beams over which the pre-reservation signal can be transmitted based at least in part on the transmitter beam; or information that indicates to transmit the pre-reservation signal using an omni-directional transmission.

Aspect 10: The method of any of Aspects 1-9, wherein identifying the beamforming information comprises identifying an association between a transmitter beam associated with the data transmission and a reservation beam associated with the pre-reservation signal, wherein the association between the transmitter beam and the reservation beam is indicated using a quasi co-location relationship and one or more transmission configuration indicator state identifiers.

Aspect 11: The method of any of Aspects 1-10, wherein identifying the beamforming information comprises identifying one or more reservation beams for transmitting the pre-reservation signal based at least in part on a transmitter UE implementation and a time restriction associated with a processing capability of the transmitter UE.

Aspect 12: The method of any of Aspects 1-11, wherein identifying the beamforming information comprises identifying beam prioritization information based at least in part on a time window for transmitting the pre-reservation signal.

Aspect 13: The method of Aspect 12, wherein the beam prioritization information indicates priority information for one or more beam directions.

Aspect 14: A method of wireless communication performed by a receiver user equipment (UE), comprising: receiving, from a transmitter UE, a pre-reservation signal that indicates a set of non-preferred resources associated with a data transmission; and transmitting an indication of the pre-reservation signal to another receiver UE, or transmitting a conflict indication to the transmitter UE, based at least in part on beamforming information associated with the pre-reservation signal.

Aspect 15: The method of Aspect 14, further comprising selecting one or more resources to be used for a data transmission by the receiver UE based at least in part on a reference signal received power indicator and a beam direction associated with receiving the pre-reservation signal.

Aspect 16: The method of Aspect 15, wherein selecting the one or more resources to be used for the data transmission by the receiver UE comprises performing a resource exclusion operation based at least in part on the set of non-preferred resources.

Aspect 17: The method of any of Aspects 14-16, wherein transmitting the indication of the pre-reservation signal to the other receiver UE comprises transmitting an indication of the set of non-preferred resources to the receiver UE over one or more beam directions.

Aspect 18: The method of Aspect 17, further comprising determining the one or more beam directions for transmitting the indication of the set of non-preferred resources to the receiver UE, wherein determining the one or more beam directions comprises: determining the one or more beam directions based at least in part on one or more beams associated with receiving the pre-reservation signal; determining the one or more beam directions and a transmission precoder based at least in part on a signal power or signal quality associated with receiving the pre-reservation signal; or determining the one or more beam directions based at least in part on a time remaining to an earliest resource or a latest resource indicated in the set of non-preferred resources and a processing time associated with the receiver UE.

Aspect 19: The method of any of Aspects 14-18, further comprising determining whether to transmit the indication of the pre-reservation signal to the other receiver UE based at least in part on the transmitter UE being a UE from which the receiver UE is configured to receive the pre-reservation signal, based at least in part on comparing a reference signal received power or a reference signal received quality of the pre-reservation signal to a threshold, or based at least in part on a beam direction that is used for receiving the pre-reservation signal.

Aspect 20: The method of any of Aspects 14-19, further comprising determining whether to transmit the conflict indication to the transmitter UE based at least in part on identifying a potential collision associated with one or more resources that are included in the set of non-preferred resources.

Aspect 21: The method of Aspect 20, further comprising transmitting the conflict indication to the transmitter UE based at least in part on the transmitter UE having a same priority or a lower priority than a UE that previously reserved the one or more resources that are included in the set of non-preferred resources.

Aspect 22: The method of Aspect 20, wherein the conflict indication includes an indication of the one or more resources that are included in the set of non-preferred resources.

Aspect 23: The method of Aspect 20, wherein transmitting the conflict indication to the transmitter UE comprises transmitting the conflict indication to the transmitter UE using a resource that was used by the transmitter UE for transmitting the pre-reservation signal.

Aspect 24: An apparatus for wireless communication at a device, comprising a processor; memory coupled with the processor; and instructions stored in the memory and executable by the processor to cause the apparatus to perform the method of one or more of Aspects 1-13.

Aspect 25: A device for wireless communication, comprising a memory and one or more processors coupled to the memory, the one or more processors configured to perform the method of one or more of Aspects 1-13.

Aspect 26: An apparatus for wireless communication, comprising at least one means for performing the method of one or more of Aspects 1-13.

Aspect 27: A non-transitory computer-readable medium storing code for wireless communication, the code comprising instructions executable by a processor to perform the method of one or more of Aspects 1-13.

Aspect 28: A non-transitory computer-readable medium storing a set of instructions for wireless communication, the set of instructions comprising one or more instructions that, when executed by one or more processors of a device, cause the device to perform the method of one or more of Aspects 1-13.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a transmitter user equipment (UE), comprising:
    a memory; and
    one or more processors, coupled to the memory, configured to:
    identify beamforming information for transmitting a pre-reservation signal that indicates a set of non-preferred resources associated with a data transmission; and
    transmit, to a receiver UE in accordance with the beamforming information, the pre-reservation signal that indicates the set of non-preferred resources associated with the data transmission, wherein transmitting the pre-reservation signal comprises transmitting sidelink control information (SCI), a medium access control (MAC) message, or a combination of the SCI and the MAC message that includes the pre-reservation signal, wherein the pre-reservation signal is not multiplexed with a current data transmission.

2. The apparatus of claim 1, wherein the set of non-preferred resources associated with the data transmission includes one or more resources that are to be used for the data transmission.

3. The apparatus of claim 1, wherein the set of non-preferred resources associated with the data transmission includes one or more other non-preferred resources that are based at least in part on a transmitter beam direction, a beam link interference, or an in-band emission estimate.

4. The apparatus of claim 1, wherein the one or more processors, to transmit the pre-reservation signal in accordance with the beamforming information, are configured to transmit the pre-reservation signal in one or more directions according to a transmitter UE configuration, transmit the pre-reservation signal in one or more directions according to a UE implementation, or transmit the pre-reservation signal across all possible beam directions.

5. The apparatus of claim 1, wherein the one or more processors, to transmit the pre-reservation signal, are configured to transmit a medium access control (MAC) message that includes the pre-reservation signal, wherein the pre-reservation signal is multiplexed with a current data transmission and is transmitted in a same direction as the current data transmission.

6. The apparatus of claim 1, wherein the one or more processors, to transmit the pre-reservation signal, are configured to transmit the pre-reservation signal a first number of slots before the data transmission or before an earliest non-preferred resource of the set of non-preferred resources, or transmit the pre-reservation signal a second select number of slots after a sensing window associated with the transmitter UE.

7. The apparatus of claim 1, wherein the one or more processors are further configured to select one or more precoders to be used for transmitting the pre-reservation signal.

8. The apparatus of claim 1, wherein the one or more processors, to identify the beamforming information for transmitting the pre-reservation signal, are configured to identify the beamforming information based at least in part on configuration information, wherein the configuration information includes:
information that indicates for the transmitter UE to transmit the pre-reservation signal over a beam or a precoder that is quasi co-located with a transmitter beam that is to be used for the data transmission;
information that indicates a set of beams over which the pre-reservation signal can be transmitted based at least in part on the transmitter beam; or
information that indicates to transmit the pre-reservation signal using an omni-directional transmission.

9. The apparatus of claim 1, wherein the one or more processors, to identify the beamforming information, are configured to identify an association between a transmitter beam associated with the data transmission and a reservation beam associated with the pre-reservation signal, wherein the association between the transmitter beam and the reservation beam is indicated using a quasi co-location relationship and one or more transmission configuration indicator state identifiers.

10. The apparatus of claim 1, wherein the one or more processors, to identify the beamforming information, are configured to identify one or more reservation beams for transmitting the pre-reservation signal based at least in part on a transmitter UE implementation and a time restriction associated with a processing capability of the transmitter UE.

11. The apparatus of claim 1, wherein the one or more processors, to identify the beamforming information, are configured to identify beam prioritization information based at least in part on a time window for transmitting the pre-reservation signal.

12. The apparatus of claim 11, wherein the beam prioritization information indicates priority information for one or more beam directions.

13. An apparatus for wireless communication at a receiver user equipment (UE), comprising:
a memory; and
one or more processors, coupled to the memory, configured to:
receive, from a transmitter UE, a pre-reservation signal that indicates a set of non-preferred resources associated with a data transmission; and
transmit an indication of the pre-reservation signal to another receiver UE, or transmit a conflict indication to the transmitter UE, based at least in part on beamforming information associated with the pre-reservation signal, wherein transmitting to the another receiver UE the indication of the pre-reservation signal comprises transmitting sidelink control information (SCI), a medium access control (MAC) message, or a combination of the SCI and the MAC message that includes the pre-reservation signal, wherein the pre-reservation signal is not multiplexed with a current data transmission.

14. The apparatus of claim 13, wherein the one or more processors are further configured to select one or more resources to be used for a data transmission by the receiver UE based at least in part on a reference signal received power indicator and a beam direction associated with receiving the pre-reservation signal.

15. The apparatus of claim 14, wherein the one or more processors, to select the one or more resources to be used for the data transmission by the receiver UE, are configured to perform a resource exclusion operation based at least in part on the set of non-preferred resources.

16. The apparatus of claim 13, wherein the one or more processors, to transmit the indication of the pre-reservation signal to the other receiver UE, are configured to transmit an indication of the set of non-preferred resources to the receiver UE over one or more beam directions.

17. The apparatus of claim 16, wherein the one or more processors are further configured to determine the one or more beam directions for transmitting the indication of the set of non-preferred resources to the receiver UE, wherein the one or more processors, to determine the one or more beam directions, are configured to:
determine the one or more beam directions based at least in part on one or more beams associated with receiving the pre-reservation signal;
determine the one or more beam directions and a transmission precoder based at least in part on a signal power or signal quality associated with receiving the pre-reservation signal; or
determine the one or more beam directions based at least in part on a time remaining to an earliest resource or a latest resource indicated in the set of non-preferred resources and a processing time associated with the receiver UE.

18. The apparatus of claim 13, wherein the one or more processors are further configured to determine whether to transmit the indication of the pre-reservation signal to the other receiver UE based at least in part on the transmitter UE being a UE from which the receiver UE is configured to receive the pre-reservation signal, based at least in part on comparing a reference signal received power or a reference signal received quality of the pre-reservation signal to a threshold, or based at least in part on a beam direction that is used for receiving the pre-reservation signal.

19. The apparatus of claim 13, wherein the one or more processors are further configured to determine whether to transmit the conflict indication to the transmitter UE based at least in part on identifying a potential collision associated with one or more resources that are included in the set of non-preferred resources.

20. The apparatus of claim 19, wherein the one or more processors are further configured to transmit the conflict indication to the transmitter UE based at least in part on the transmitter UE having a same priority or a lower priority than a UE that previously reserved the one or more resources that are included in the set of non-preferred resources.

21. The apparatus of claim 19, wherein the conflict indication includes an indication of the one or more resources that are included in the set of non-preferred resources.

22. The apparatus of claim 19, wherein the one or more processors, to transmit the conflict indication to the transmitter UE, are configured to transmit the conflict indication to the transmitter UE using a resource that was used by the transmitter UE for transmitting the pre-reservation signal.

23. A method of wireless communication performed by a transmitter user equipment (UE), comprising:
    identifying beamforming information for transmitting a pre-reservation signal that indicates a set of non-preferred resources associated with a data transmission, wherein identifying the beamforming information comprises identifying one or more reservation beams for transmitting the pre-reservation signal based at least in part on a transmitter UE implementation and a time restriction associated with a processing capability of the transmitter UE; and
    transmitting, to a receiver UE in accordance with the beamforming information, the pre-reservation signal that indicates the set of non-preferred resources associated with the data transmission.

24. The method of claim 23, wherein identifying the beamforming information comprises identifying beam prioritization information based at least in part on a time window for transmitting the pre-reservation signal.

25. The method of claim 24, wherein the beam prioritization information indicates priority information for one or more beam directions.

26. A method of wireless communication performed by a receiver user equipment (UE), comprising:
    receiving, from a transmitter UE, a pre-reservation signal that indicates a set of non-preferred resources associated with a data transmission; and
    transmitting an indication of the pre-reservation signal to another receiver UE, or transmitting a conflict indication to the transmitter UE, based at least in part on beamforming information associated with the pre-reservation signal, wherein transmitting to the another receiver UE the indication of the pre-reservation signal comprises transmitting sidelink control information (SCI), a medium access control (MAC) message, or a combination of the SCI and the MAC message that includes the pre-reservation signal, wherein the pre-reservation signal is not multiplexed with a current data transmission.

27. The method of claim 26, further comprising selecting one or more resources to be used for a data transmission by the receiver UE based at least in part on a reference signal received power indicator and a beam direction associated with receiving the pre-reservation signal.

28. The method of claim 26, wherein transmitting the indication of the pre-reservation signal to the other receiver UE comprises transmitting an indication of the set of non-preferred resources to the receiver UE over one or more beam directions.

* * * * *